United States Patent [19]

Podder

[11] Patent Number: 4,648,883
[45] Date of Patent: Mar. 10, 1987

[54] PROCESS FOR THE PREPARATION OF STORAGE STABLE AQUEOUS FORMULATIONS OF ANIONIC DYES: AMON EXCHANGE RESIN TREATMENT

[75] Inventor: Nitya G. Podder, Birsfelden, Switzerland

[73] Assignee: Ciba-Geigy Corporation, Ardsley, N.Y.

[21] Appl. No.: 755,381

[22] Filed: Jul. 16, 1985

[30]     Foreign Application Priority Data

Jul. 25, 1984 [CH] Switzerland .......................... 3601/84

[51] Int. Cl.$^4$ .......................... B01F 3/12; C09B 67/34; D06P 1/61
[52] U.S. Cl. ............................................ 8/527; 8/440; 8/554; 8/606; 8/680; 8/611; 8/917; 8/924
[58] Field of Search ............................. 8/527, 440, 554

[56]         References Cited
         U.S. PATENT DOCUMENTS

| 3,932,127 | 1/1976 | D'Albignac | 8/502 |
| 4,066,595 | 1/1978 | Bunge | 8/554 |
| 4,265,631 | 5/1981 | Becker | 8/471 |

FOREIGN PATENT DOCUMENTS 3305012 8/1983 Fed. Rep. of Germany .

OTHER PUBLICATIONS

Chemical Abstract, vol. 99, (1983), 99:214153v, Water-insoluble Salts of Cationic Dyes, p. 90.

*Primary Examiner*—A. Lionel Clingman
*Attorney, Agent, or Firm*—Edward McC. Roberts; Meredith C. Findlay; Kevin T. Mansfield

[57]            ABSTRACT

The invention relates to a process for the preparation of a storage stable aqueous formulation of anionic dyes, which process comprises treating the aqueous dye solution and/or dispersion with a polymeric anion exchanger, simultaneously and/or subsequently subjecting the resin-bonded dye to a mechanical wet grinding, in the presence of a nonionic dispersant, and adding to the resultant aqueous dispersion the assistants customarily present in the liquid dye formulations.

The process makes it possible to precipitate anionic dyes in virtually quantitative yield from aqueous solution and to prepare storage-stable dye dispersions.

14 Claims, No Drawings

PROCESS FOR THE PREPARATION OF STORAGE STABLE AQUEOUS FORMULATIONS OF ANIONIC DYES: AMON EXCHANGE RESIN TREATMENT

The present invention relates to a process for the preparation of storage stable aqueous formulations of anionic dyes, to the dye dispersions obtained by said process and to the use thereof for dyeing and printing natural or synthetic fibre material.

Liquid dye formulations, solutions or dispersions have a number of advantages over powder formulations, for example no dust formation when preparing padding and dye liquors or printing pastes, no wetting problems caused by lump formation, and no specky dyeings resulting from insufficiently dissolved or insufficiently finely dispersed dye particles.

Compared with correspondingly formulated dye powders or granulates, however, the shelf life of liquid formulations is often unsatisfactory on prolonged storage. Particular problems arise in this connection with anionic dyes, which have only limited water-solubility. True solutions are not obtained with such dyes. Even if the dye dissolves completely at elevated temperature, it crystallises again partly on cooling or a colloidal solution forms. During storage, the seed crystals present in such solutions cause recrystallisation, resulting in the formation of larger or smaller agglomerates that are especially troublesome when the formulations are used for textile printing and lead to specky prints.

Furthermore, complications may arise even in the preparation of the anionic dyes employed, for example if—as is often customary at the present time—it is desired to reduce the salt content of the dyes resulting from the synthesis by means of a membrane separation process. The dye particles formed by recrystallisation and agglomeration often clog the membrane pores and so cause a drastic fall in the rate of flow.

There are, in principle, two possibilities of preventing the recrystallisation of dyes of limited water solubility. The one possibility consists in completely dissolving the dye by addition of suitable organic solvents, even at room temperature. Such true solutions are generally stable over lengthy periods of time and do not have a propensity to form precipitations or agglomerates. However, the addition of solvents can have a deleterious effect on the dyeings obtained, is generally undesirable for reasons of industrial hygiene and, in addition, pollutes the dyehouse waste-waters. The second possibility consists in converting the dye, by varying the cation, into a dye salt of as low water-solubility as possible, so that the dye is substantially present in dispersed form. This method, however, is highly dye-specific, requires extensive preliminary trials, and succeeds only with a few dyes.

It has now been found that, by bonding the dye reversibly by ion exchange to a cationic polymeric carrier, it is possible to convert the dye almost completely into a water-insoluble form.

Accordingly, the present invention relates to a process for the preparation of a storage stable aqueous formulation of anionic dyes, which process comprises treating the aqueous dye solution and/or dispersion with a polymeric anion exchanger, simultaneously and/or subsequently subjecting the resin-bonded dye to a mechanical wet grinding, in the presence of a nonionic dispersant, and adding to the resultant aqueous dispersion the assistants customarily present in liquid dye formulations.

Examples of suitable anionic dyes are nitro, aminoketone, ketoneimine, methine, nitrodiphenylamine, quinoline, aminonaphthoquinone or coumarin dyes and, in particular, anthraquinone, phthalocyanine and azo dyes such as monoazo and disazo dyes. The dyes belong to the most widely differing classes and are, for example, acid, direct, metal complex or reactive dyes.

These dyes contain at least one anionic water-solubilising group, for example a carboxylic acid group or, in particular, a sulfonic acid group. The dyes are in general in the form of their salts, for example as lithium, sodium, potassium or ammonium salt. The dyes are water-soluble and about 2 to 30 g of dye dissolve in 1 liter of water of 20° C. They may be used both as pure dye powder and as salt-containing crude dye, and also as moist aqueous filter cake, or also direct in the form of the dye solution or suspension obtained from the synthesis. It will readily be understood that the process can also be carried out with mixtures of dyes, namely with mixtures of dyes of the same class as well as those belonging to different classes. Suitable mixtures are, for example, mixtures of acid, direct or reactive dyes with metal complex dyes, or of direct dyes with reactive and acid dyes. Further, in the process of this invention it is also possible to process anionic dyes in admixture with disperse dyes to give storage stable formulations. Finally, in the context of this invention, the term "dye" will also be understood as meaning fluorescent whitening agents.

Strongly basic as well as weakly basic anion exchangers can be used in the process of this invention. In particular, commercially available ion exchange resins are used, preferably those having a polystyrene matrix crosslinked by divinylbenzene or diethylene glycol dimethacrylate or by chloromethylation. These ion exchange resins contain, a functional groups, in particular quaternary ammonium groups such as trimethylammonium groups or hydroxyethyldimethylammonium groups, or also primary, secondary or tertiary amino groups. Also suitable are those ion exchange resins whose matrix consists, for example, of one of the following natural or synthetic materials: three-dimensionally crosslinked polysaccharide, e.g. derived from dextran, and also cellulose, dextrin, copolymer of acrylamide/methacrylic acid, or also reaction products of an aminoplast precondensate and a methylolated carbamide. Such ion exchange resins are insoluble in water because of their highly polymeric character. However, the process is not restricted to such types of ion exchange resin and can, in principle, be carried out with polymeric ion exchange resins of greater or lesser water-solubility. However, the condition is that, upon completion of ion exchange, the reaction product of dye and polymer is insoluble in water, so that an aqueous dispersion can likewise be prepared by mechanical wet grinding. The water-soluble ion exchange resins are, for example, polyquaternary ammonium salts with a molecular weight greater than 1000, preferably from 10,000 to 1,000,000.

The amount in which the anion exchanger is employed in the process of this invention will depend primarily on its capacity, i.e. on the number of removable counterions per unit of mass or volume of the ion exchange resin. Depending on the exchange capacity, about 0.2 to 5 parts by weight of ion exchange resin are used per 1 part by weight of crude dye. The ion exchange resin is preferably used in bead form and is normally in OH or chloride form.

Wet grinding process will be understood as meaning in particular the wet grinding which is carried out for example in a stirred ball mill, sand mill or Dyno mill (registered trademark of W. A. Bachofen Maschinenfabrik, Basel) until the size of the dye/ion exchange resin is <10 μm, preferably <5 μm. To shorten the grinding time, it is advantageous to precomminute the the ion exchange resin before the reaction with the dye or to grind it until a primary particle size of <10 μm is attained.

Grinding the anion exchanger to such a small particle size has the advantage that a wet grinding of the resin-bonded dyes can then be dispensed with. Afterwards the finely ground ion exchange resin, conveniently in the presence of a nonionic dispersant, is reacted with the dye to be formulated and thereafter only the assistants customarily present in liquid formulations are added to the finely particulate dispersion so obtained (no agglomerates may form during the reaction), which, if desired, is then adjusted to commercial strength with extenders. It is convenient to remove water-soluble inert salts and by-products from the dye/ion exchange resin dispersion, advantageously by means of a membrane separation process. As regards the wet grinding, this procedure is carried out in the presence of a nonionic dispersant and preferably using an ethylene oxide adduct of the class of the adducts of ethylene oxide with higher fatty acids, saturated or unsaturated fatty alcohols, mercaptans, fatty acid amides, fatty acid alkylolamides or fatty amines, or with alkylphenols or alkylthiophenols containing not less than 7 carbon atoms in the alkyl moiety, as well as with ricinolates or hydroxyabietyl alcohol, which adducts preferably contain 5 to 100 moles of ethylene oxide per mole of cited compounds. Individual ethylene oxide units may be replaced by other epoxides, for example styrene oxide or, preferably, propylene oxide.

Specific ethylene oxide adducts are:
(a) adducts of saturated and/or unsaturated $C_8$–$C_{20}$ fatty alcohols and 20 to 100 moles of ethylene oxide per mole of alcohol;
(b) adducts of $C_7$–$C_{12}$ alkylphenols and 5 to 20 moles, preferably 8 to 15 moles, of ethylene oxide per mole of phenolic hydroxyl group;
(c) adducts of saturated and/or unsaturated $C_8$–$C_{20}$ fatty amines and 5 to 20 moles of ethylene oxide per mole of amine;
(d) adducts of saturated and/or unsaturated $C_8$–$C_{20}$ fatty acids and 5 to 20 moles of ethylene oxide per mole of fatty acid;
(e) an adduct of 1 mole of ricinolate and 15 moles of ethylene oxide;
(f) an adduct of 1 mole of hydroxyabietyl alcohol and 25 moles of ethylene oxide.

Mixtures of ethylene oxide adducts (a) to (f) above with one another can also be used. These mixtures are obtained by mixing individual adducts or direct by ethoxylating a mixture of compounds from which the adducts are derived.

Good results are also obtained with reaction products of fatty acids and hydroxyalkylamines as well as with N-perfluoroalkyl-N-methylpolyoxyalkylene carbamide esters of the formula

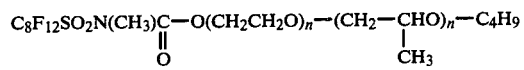

wherein n is 8 to 20, or also with mono-O-dodecyl derivatives of aldoses (q.v. B. Havlinova et al., Tenside Detergents 15 (1978), 72–74).

In particular, however, copolymers of ethylene oxide and propylene oxide are used in the process of this invention, preferably ethylene oxide/propylene oxide block polymers with a molecular weight of 6000 to 22,500 and having the following structure

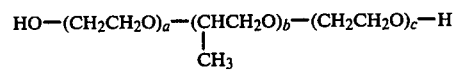

The indices a, b and c denote an integer, the sum of a and c being from 100 to 400 and b being a number from 30 to 80. Particularly suitable block polymers are those containing more than 65% by weight, preferably 80% by weight, of ethylene oxide.

The nonionic dispersants employed are preferably those of low electrolyte content, especially whenever the formulations obtained by the process of this invention are used for textile printing, as even small amounts of electrolyte often result in a drastic reduction in the viscosity of synthetic thickeners. The nonionic dispersant will preferably be used in an amount of 10 to 80% by weight, based on crude dye.

After the treatment with the anion exchanger, before the wet grinding or after it, or when using a finely ground anion exchanger, even without corresponding wet grinding, the suspension or dispersion of the dye-/anion exchanger is conveniently freed as far as possible from dissolved inert salts and low molecular by-products. The inorganic or also organic salts result from the dye synthesis and their presence in the aqueous suspension or dispersion derives from the crude dye and/or they have formed in the course of the ion exchange, for example if the anion exchanger is employed in chloride form. The separation of the salt-containing aqueous solution from the dye treated with the ion exchange resin can be effected, for example, by decantation, centrifugation or also filtration. However, in the process of this invention it is preferred to effect the salt removal by a membrane separation process. The following membrane filtering methods are preferably employed:

microfiltration using pore membranes having a pore diameter of 0.5 to 20 μm
ultrafiltration using finely porous membranes having a pore diameter of 10 Å to 1 μm
hyperfiltration through ion exchanger or solvent diffusion membranes having a pore diameter of <20Å.

Concerning the theory and use of membrane separating processes, reference is made e.g. to H. Strathmann, Chemie-Technik 7, 333 (1978), or to W. Pusch, A. Walch, Angew. Chem. 94, 670 (1982).

Of the above filtration processes it is preferred to employ hyperfiltration in th practice of this invention.

In contradistinction to conventional filtration, in which solid particles are separated from a liquid, this separation process is a selective molecular separation method. The membrane acts as a molecular sieve and is able to retain dissolved substances, if the molecular size is sufficient, on the contact surface of the membrane. It is convenient to use membranes with a cut-off level having a retention of at least 90% when these are subjected to continuous hyperfiltration for 20 to 30 minutes. They permit water and dissolved substances whose molecular weight is below the cut-off level to pass through under low to medium pressure. In the process of this invention, pressures of 10 to 100 bar, preferably 10 to 30 bar, are applied.

Particularly useful membranes are those made of cellulose acetate, polyvinyl alcohol or polyacrylonitrile and which have been modified by reactive dyes and contain sulfo and/or carboxyl groups. Such membranes are described e.g. in German Offenlegungschrift 25 05 254. The membranes have a pore diameter of 0.1 to 50 nm.

As the dye is bonded to a polymeric carrier, very good salt removal is also achieved by ultrafiltration in a relatively short time. Suitable membranes are those made of organic and those made of inorganic material. Examples of organic membrane materials are polyvinylidene fluoride, cellulose acetate, polytetrafluoroethylene, copolymers of polyacrylonitrile and vinyl pyrrolidone, polysulfone, polyamide or also hydrophilised polyolefins. Examples of inorganic membranes are those of porous carbon, the surface of which is coated with a thin layer of zirconium oxide or aluminium oxide, or of porous glass. Both organic and inorganic membranes are conveniently used in tube form, with several tubes being comprised in a tube membrane module.

It is preferred to use inorganic membranes because of their good resistance to pH fluctuations.

After the wet grinding, the dye/ion exchange resin dispersion, from which salts have been removed in an optional further step, is freed, if necessary, from an insignificant amount of coarse particles by intermediate sieving and further processed to a storage stable liquid formulation.

To prepare a commercial liquid formulation it is only necessary to adjust the dye/ion exchanger dispersion, if desired after the addition of assistants conventionally employed in liquid formulations, e.g. textile auxiliaries, foam inhibitors, antifreeze agents, humectants, dispersants viscosity improvers and/or microbicides, to a predetermined final dye concentration by dilution and/or with the aid of extenders. Suitable antifreeze agents are, for example, polyols such as ethylene glycol, monopropylene glycol, glycerol or sorbitol, as single components or in admixture. Suitable microbicides are e.g. chloroacetamide or aqueous formalin solution; and suitable antifoams are e.g. those based on silicone oil or a mixture of an alkyl phosphate and an alkylpolyethylenepolypropylene glycol ether, or also tertiary acetylene glycols.

The process of the present invention can be carried out, for example, by the following two variants: on the one hand in a one-step process and, on the other, in a two-step process.

In the one-step process, the dye is treated with the anion exchanger and simultaneously subjected to wet grinding in the presence of the nonionic dispersant. The grinding procedure causes a thorough mixing of the system and the ion exchange proceeds fairly rapidly. Concentration of the dispersion and removal of salts by a membrane separation process, for example hyperfiltration, advantageously follows. Then conventional assistants, for example a humectant, are added to the concentrated liquid formulation of low salt content, which is adjusted to the desired colour strength. Besides this preferred process, the treatment of the dye with the ion exchanger and the wet grinding can be carried out in discrete individual steps. In this two-step process, the separation of the water-soluble by-products, in particular of the inorganic salts, can be effected e.g. by simple decantation or filtration before the wet grinding procedure. The salts can be substantially removed by additionally washing the dye treated with the ion exchange resin after separation of the aqueous phase. The wet grinding procedure then follows with the addition of a nonionic dispersant. The reaction product of dye and ion exchange resin can be dried before the wet grinding. The final formulation of the dye is then carried out as described for the one-step process.

In principle it is also possible to add the anion exchanger to the reaction medium before the dye synthesis, i.e. to carry out the preparation of the dye in the presence of an anion exchanger. The synthesis of the dye and the treatment thereof with the anion exchanger then proceed virtually simultaneously and the product of the synthesis is the dye already bonded to the exchange resin. In this procedure it is possible to utilise the generally better filtering property of the resin-bonded dye when working up the reaction mixture. To carry out this process variant it is convenient to use a finely ground ion exchange resin with a particle size of <10 $\mu$m, preferably together with a dispersant.

The advantages of the process of this invention are:
a virtually quantitative precipitation of the anionic dye from aqueous solution induced by the ion exchange resin;
the suspension or dispersion of the dye/ion exchange resin can be readily filtered and, in particular, also freed from salts and concentrated by a membrane separation process;
troublesome by-products (low molecular neutral compounds) can be washed out of the filter cake with water and without loss of dye;
no intermediate isolation is necessary, as the dye can be treated direct with the ion exchange resin after the synthesis;
the process can be readily carried out without complicated apparatus.

The present invention further relates to the storage-stable aqueous formulations of anionic dyes obtained by the process of the invention and to the use of said formulations for dyeing and printing natural or synthetic fibre material. The dye formulations are particularly suitable for textile printing on polyamide to give speck-free dyeings of sharp definition. The formulations are true dispersions, they are of low viscosity and can be stored for several months in the temperature range from −10° to +40° C. without the formation of agglomerates or a solid sediment. The formulations are substantially resistant to temperature fluctutations. A deposit can be easily homogeneously redispersed by simple stirring or shaking. No recrystallisation occurs even during prolonged storage. The formulations of this invention contain no organic solvents.

The invention is illustrated in more detail by the following Examples, in which parts and percentages are by weight unless otherwise stated.

EXAMPLE 1

36.1 parts of an anion exchanger (water-insoluble resin based on styrene/divinylbenzene and containing quaternary ammonium groups as functional groups) are added to a solution consisting of 1257.5 parts of water and 48.0 parts of a propylene oxide/ethylene oxide block polymer (mol. wt. about 16,500) containing a central propylene oxide unit and 80% of ethylene oxide. The ion exchanger is used in the chloride form and has a total capacity of 3 mval CaCo$_3$/g. Then 258.5 parts of the filter cake (solids content 28.6%) of the dye of the formula

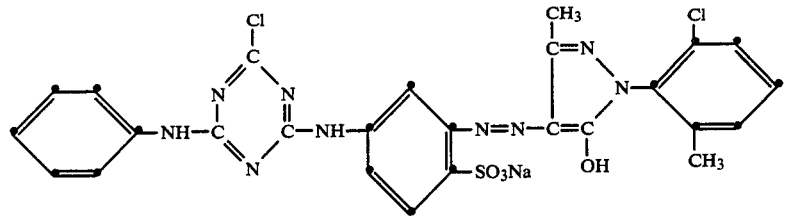

is added, with stirring, in portions and the suspension is homogenised. The mixture is then ground and dispersed in a sand mill until ion exchange is complete and no more free dye is present in the mixture. The particle size of the dye/ion exchange resin dispersion is <5 μm; most of the particles are <2 μm. The fine dispersion so obtained is separated from the grinding elements, concentrated by hyperfiltration and freed from salts. An anionically modified cellulose acetate membrane with a cut-off level of 500 is used for the hyperfiltration. 15% of propylene glycol is added as humectant to the concentrated dispersion. The dispersion contains 20.4% of dye. The formulation is of low viscosity and no sediment forms even after storage for several months. When incorporated in a printing paste, the liquid formulation gives on polyamide a non-specky print which is free from frosting effect. The quality of the print is equally good before and after storage of the dye formulation. A parallel test carried out without anion exchanger and using the same dye gives a dispersion which clogs the membrane during hyperfiltration and which therefore cannot be either concentrated or freed from salts in this manner.

A good storage-stable dye dispersion is obtained by using an anion exchanger and a nonionic dispersant listed in the following table instead of the styrene/divinylbenzene anion exchanger and the ethylene oxide/propylene oxide block polymer employed in this Example.

| Example | Anion exchanger | Dispersant |
|---|---|---|
| 2 | three-dimensionally crosslinked polysaccharide; functional groups: —OC$_2$H$_4$N(C$_2$H$_5$)$_2$ | fatty alcohol ethoxylate R—O—(CH$_2$CH$_2$O)$_n$H R = C$_{11}$-C$_{18}$alkyl average value of n = 18 (mol. wt. ~1000) |
| 3 | three-dimensionally crosslinked polysaccharide; functional groups: —OCH$_2$—C$_6$H$_4$—NH$_2$ | castor oil ethoxylate (1 mole of ricinoleic acid + c. 15 moles of ethylene oxide) |
| 4 | modified cellulose; functional groups: —O—CH$_2$—NH—C(=O)—CH$_2$CH$_2$—N(CH$_2$CH$_2$OH)(CH$_2$CH$_2$OH) chloride form | nonylphenol pentadecaglycol ether |
| 5 | modified cellulose; functional groups: —O—CH$_2$—NH—C(=O)—CH$_2$CH$_2$—N(C$_2$H$_5$)(C$_2$H$_5$) chloride form: | cetyl/stearyl alcohol, etherified with 25 moles of ethylene oxide |
| 6 | modified dextrin; functional groups: —CH$_2$—O—CH$_2$—NH—C(=O)—CH$_2$CH$_2$—N(C$_2$H$_5$)(C$_2$H$_5$) chloride form | stearic acid ethoxylate (1 mole of fatty acid + c. 9 moles of ethylene oxide) |

EXAMPLE 7

160.1 parts of dry ground anion exchanger (particle size <100 μm) and 282.4 parts of dye are added, with stirring, in portions to a solution of 1197.5 parts of water and 60 parts of an ethylene oxide/propylene oxide block polymer, and the suspension is throughly homogenised. The block polymer, the ion exchanger and the dye are the same as those employed in Example 1. The mixture is ground and dispersed in a Dyno mill until the ion exchange is complete and no more free dye is present in the mixture. The particle size of the dye-/ion exchange resin dispersion is c. <5 μm, with the bulk of the particles having a size <2 μm.

The fine dispersion so obtained is separated from the grinding elements and concentrated and freed from salts by hyperfiltration as described in Example 1. 15% of propylene glycol is added as humectant to the concentrated dispersion.

The resultant dispersion contains 32.0% of dye. The liquid formulation is of low viscosity, storage-stable and exhibits no sedimentation during storage. Even after storage, a non-specky print which is free from frosting effect is obtained on polyamide with the formulation.

EXAMPLE 8

160.1 parts of dry ground anion exchanger (particle size <100 μm) are added to a solution of 1197.5 parts of water and 60 parts of an ethylene oxide/propylene oxide block polymer. The ion exchanger and the block polymer are the same as those employed in Example 1. The suspension is ground in a closed mill until the particle size is <5 μm. With stirring, 282.4 parts of the dye employed in Example 1 are added to the wet ground ion exchanger. The mixture is ground in a Dyno mill as described in Example 2.

The resultant dispersion is concentrated and freed from salts by hyperfiltration. To the concentrated dispersion are added 15% of propylene glycol as humectant and 1% of formalin as preservative. The concentration of dye in the formulation is 18.9%. The formulation is of low viscosity and is well suited for printing on polyamide even after prolonged storage.

EXAMPLE 9

To a suspension of 16 parts of anion exchanger (water-insoluble styrene/divinylbenzene copolymer containing quaternary ammonium groups in chloride form) in 561.6 parts of deionised water are added 130.4 parts of the filter cake (solids content 28.6%) of the dye employed in Example 1. The mixture is stirred until no more free dye can be detected. Then the sodium chloride resulting from the ion exchange is washed out of the resin-bonded dye with deionised water and the dye is subsequently dried at 80° C. in vacuo.

39 parts of the dry, salt-free product together with 6 parts of ethylene oxide/propylene oxide block polymer (same type as in Example 1), 15 parts of propylene glycol and 40 parts of water are ground and dispersed in a sand mill until the particle size is <5 μm. The resultant fine dispersion is separated from the grinding elements. It is storage-stable and gives blemish-free results in textile printing on polyamide.

EXAMPLE 10

127.3 parts of the filter cake (solids content 28.6%) of the dye of the formula employed in Example 1 are dissolved at 80° C. in 1675 parts of deionised water. The solution is filtered through a filter cloth. With stirring, 167.5 parts of a 18.4% aqueous solution of a polyquaternary ammonium chloride salt based on a polyvinyl pyrrolidone copolymer (mol. wt. about 10,000) are slowly added dropwise to the dye solution, which has a temperature of 60° C. Precipitation occurs at once. The mixture is stirred for 1 hour at decreasing temperature, then the precipitate is isolated by filtration on a filter cloth and washed free of salt with deionised water. The resin-bonded dye is vacuum dried at 80° C. Then 53 parts of the dry product together with 5 parts of a block polymer of propylene oxide and ethylene oxide (molecular weight and ethylene oxide content as in Example 1), 15 parts of propylene glycol and 37 parts of water are ground in a sand mill until the particle size is about <5 μm, affording a low viscosity, storage-stable dye dispersion with good performance properties.

A low viscosity dye dispersion of good storage stability and comparably good performance properties are obtained by using an aqueous solution of a polydiallyldimethylammonium chloride instead of the polyvinyl pyrrolidone copolymer.

EXAMPLE 11

With stirring, 129 parts of dry ground anion exchanger (particle size <100 μm) are added, in portions, to a solution consisting of 1180 parts of water and 51 parts of a block polymer of propylene oxide and ethylene oxide (molecular weight and ethylene oxide content as in Example 1). The ion exchange resin is the same as that employed in Example 1. The suspension is ground in a Dyno mill until the particle size is <5 μm. To the wet ground ion exchange resin are then added, with stirring, 340 parts of a filter cake (solids content 60%) of the dye of the formula

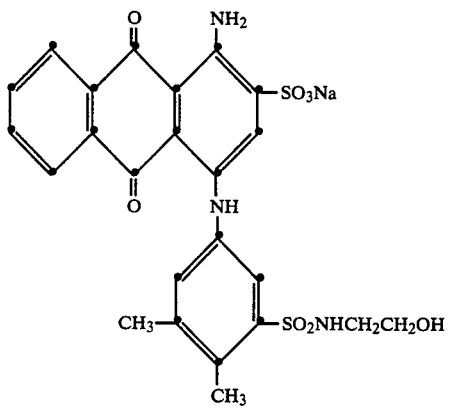

The mixture is ground in a closed mill (Dyno mill) as described in Example 2, but can also be concentrated and freed from salts by hyperfiltration without further grinding. A zirconium oxide membrane (graphite matrix which is coated on the inner side with zirconium oxide) in tube form with a cut-off level of about 20,000 is used for the hyperfiltration. To the concentrated dispersion are added 15% of propylene glycol as humectant and 5% of a block polymer of propylene oxide and ethylene oxide (molecular weight and ethylene oxide content as in Example 1) as dispersant. The content of dye in the formulation is 20%. A stable, low viscosity dye dispersion with nuch the same good properties as in Example 1 is obtained.

EXAMPLE 12

With stirring, 320 parts of dry ground anion exchanger (particle size <100 μm) are added to a solution consisting of 3203 parts of water and 135 parts of a block polymer of propylene oxide and ethylene oxide (molecular weight and ethylene oxide content as in Example 1). The ion exchange resin is the same as that employed in Example 1. The suspension is ground in a Dyno mill until the particle size is <5 μm. To the wet ground ion exchange resin are then added, with stirring, 842 parts of a filter cake (solids content 56%) of the dye of the formula

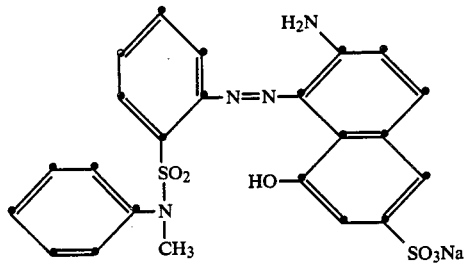

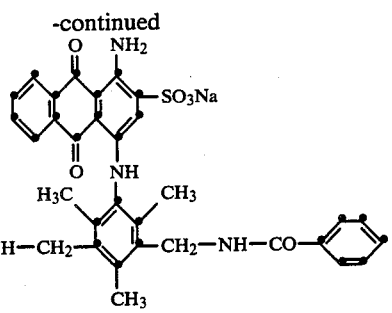

The mixture is ground in a closed mill (Dyno mill) as described in Example 2 and then concentrated and freed from salts by hyperfiltration as described in Example 1. 15% of propylene glycol and are added as humectant to the concentrated dispersion. The content of dye in the formulation is 27%. A stable, low viscosity dye dispersion with much the same good properties as in Example 1 is obtained.

EXAMPLE 13

With stirring, 207 parts of dry ground anion exchanger (particle size <100 μm) are added, in portions, to a solution consisting of 926 parts of water and 51 parts of a block polymer of propylene oxide and ethylene oxide (molecular weight and ethylene oxide content as in Example 1). The exchange resin is the same as that employed in Example 1. The suspension is ground in a Dyno mill until the particle size is <5 μm. To the wet ground ion exchange resin are then added, with stirring, 516 parts of a filter cake (solids content 40%) of the dye of the formulae (mixture of two components)

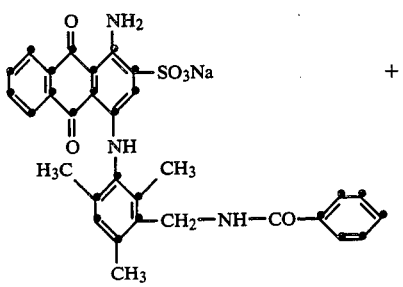

The mixture is ground in a closed mill (Dyno mill) as described in Example 2, but can also be concentrated and freed from salts by hyperfiltration without further grinding. To the concentrated dispersion are added 15% of propylene glycol as humectant. The content of dye in the formulation is 25.2%. A stable, low viscosity dye dispersion with much the same good properties as in Example 1 is obtained.

A good storage-stable dye dispersion is also obtained by using an anion exchanger and a nonionic dispersant listed in the following table instead of the styrene/divinylbenzene anion exchanger and the ethylene oxide/propylene oxide block polymer employed in this Example.

| Example | Anion exchanger | Dispersant |
|---|---|---|
| 14 | three-dimensionally crosslinked polysaccharide; functional groups: —OC$_2$H$_4$NH$_2$ | p-tert-octylphenol + c. 8 moles of ethylene oxide |
| 15 | acrylamide/methacrylic acid copolymer esterified with N—trimethylaminoethanol (mol. wt. c. 800,000) as methosulfate | ethylene oxide/propylene oxide block polymer (mol. wt. 20,000, ethylene oxide content 70%) |
| 16 | reaction product of an aminoplast precondensate and a methylolated carbamide according to publ. European patent appln. 0051044 | oleylamide polyglycol ether (degree of ethoxylation ~12–14) |
| 17 | modified cellulose; functional groups:  —O—CH$_2$—NH—CO—(CH$_2$)$_2$—N(CH$_2$OH)(CH$_2$OH)(CH$_2$OH)  hydroxide form | coconut fatty acid ethanolamide |

EXAMPLE 18

20.0 parts of the dye employed in Example 13 are dissolved at 80° C. in 1500 parts of deionised water and the solution is filtered through a filter cloth. With stirring, 114.0 parts of a 17% aqueous solution of a polyquaternary ammonium chloride salt (as in Example 5) with a molecular weight of c. 10,000 are then slowly added dropwise to the dye solution, which has been cooled to 60° C. Precipitation occurs at once. The mixture is stirred for 1 hour at decreasing temperature. The precipitate is filtered with suction on a cloth filter and washed free of salt with deionised water. The filter residue is dried at 80° C. under vacuum.

27.5 parts of the dried product and 5 parts of a propylene oxide/ethylene oxide block polymer (molecular weight and ethylene oxide content as in Example 1), 15 parts of propylene glycol and 52.5 parts of water are ground and dispersed in a sand mill until the particle size is <5 μm. The fine dispersion so obtained is separated from the grinding elements, affording a stable, low viscosity dye dispersion with much the same good properties as in Example 1.

EXAMPLE 19

53 parts of a liquid 25% dye formulation, prepared as indicated in Example 13, are stirred into 947 parts of a stock thickening of the following composition and the mixture is homogenised:

| | |
|---|---|
| 50 | parts of urea |
| 290 | parts of water |
| 600 | parts of guar gum thickener (8% solution) and |
| 60 | parts of ammonium tartrate solution with a density of 1.12 |
| 1000 | parts. |

A polyamide fabric is printed with this printing paste on a flat bed printing machine and dried at about 70° C. A non-specky print which is free from frosting effect is obtained.

What is claimed is:

1. A process for the preparation of a storage stable aqueous formulation of anionic dyes, which process comprises treating the aqueous dye solution or dispersion with a polymeric anion exchange resin, simultaneously or subsequently subjecting the resin-bonded dye to a mechanical wet grinding, in the presence of a nonionic dispersant, and adding to the resultant aqueous dispersion the assistants customarily present in the liquid dye formulations.

2. A process according to claim 1, wherein the treatment of the dye with the anion exchanger and the wet grinding are carried out simultaneously.

3. A process according to claim 1, wherein said resin is a polymeric water-insoluble anion exchanger with a polystyrene matrix which is substituted by quaternary ammonium groups and is crosslinked by divinylbenzene or diethylene glycol dimethacrylate.

4. A process according to claim 1, wherein the wet grinding is carried out in the presence of an ethylene oxide/propylene oxide block polymer with a molecular weight of 6000 to 22,500 and having the structural formula

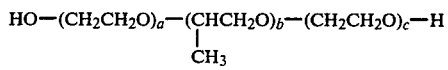

as nonionic dispersant, in which formula the indices a, b and c denote a whole number, with the proviso that the sum of a+c is a number from 100 to 400 and b is a number from 30 to 80.

5. A process according to claim 1, wherein the nonionic dispersant is used in an amount of 10 to 80% by weight, based on crude dye.

6. A process according to claim 1, wherein the resin-bonded dye is freed from water-soluble salts and by-products before or after the wet grinding.

7. A process according to claim 1, wherein the anion exchange resin has a particle size of <10 μm and the resin-bonded dye is mixed, without wet grinding, with a nonionic dispersant and the assistants customarily present in disperse liquid formulations and, in an optional further step, the dye/ion exchange resin dispersion is freed from water-soluble inert salts and by-products, before or after the addition of said assistants.

8. A process according to claim 6, wherein the removal of water-soluble salts and by-products is carried out by means of a membrane separation process.

9. A process according to claim 7, wherein the removal of water-soluble salts and by-products is carried out by means of a membrane separation process.

10. A process according to claim 1, wherein the assistants customarily added to liquid dye formulations are those selected from the group consisting of antifreeze agents, humectants, dispersants, viscosity improvers or microbicides.

11. A storage-stable dye dispersion obtained by a process as claimed in claim 1.

12. A process for dyeing or printing natural or synthetic fiber material which comprises contacting said material with an aqueous dye formulation prepared by the process of claim 1.

13. A process according to claim 8 wherein said membrane separation process is hyperfiltration.

14. A process according to claim 9 wherein said membrane separation process is hyperfiltration.

* * * * *